UNITED STATES PATENT OFFICE.

LORENZ ACH, OF MANNHEIM-WALDHOF, GERMANY, ASSIGNOR TO C. F. BOEHRINGER & SOEHNE, OF MANNHEIM-WALDHOF, GERMANY, A FIRM.

TASTELESS QUININ COMPOUND AND PROCESS OF MAKING SAME.

1,032,642.     Specification of Letters Patent.     Patented July 16, 1912.

No Drawing.     Application filed May 31, 1910. Serial No. 564,273.

*To all whom it may concern:*

Be it known that I, LORENZ ACH, a citizen of the German Empire, residing at Mannheim-Waldhof, Germany, have invented certain new and useful Improvements in Tasteless Quinin Compounds and Processes of Making Same; and I do hereby declare the following to be a full, clear, and exact description of the invention, such as will enable others skilled in the art to which it appertains to make and use the same.

Compounds of quinin which do not possess the strongly bitter taste of this alkaloid have frequently been prepared; among others also esters of quinin. The esters hitherto prepared however possess the disadvantage that the quinin contained in them does not come into full action in the organism and that consequently it is necessary to administer relatively large doses in order to obtain a sufficient therapeutic effect.

My invention consists in preparing a new compound of quinin, which is absolutely tasteless, but being readily split up exercises the full action of quinin in the organism.

The preparation of this new quinin compound is carried out by esterifying quinin with diglycollic acid according to one of the well-known methods used in similar processes of esterification. These compounds all have the formula

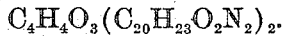

Example 1: 11 parts by weight of quinin are dissolved in the smallest possible amount of chloroform and subjected to the action of 3 parts by weight of diglycollic acid chlorid for 2-3 days in the absence of air, the mixture being cooled. The hydrochloric acid salt of the ester is thereby formed which salt is brought into solution by agitating with a 1% solution of hydrochloric acid at 0° C. This solution is then covered with a considerable layer of ether and the ester precipitated carefully with aqueous ammonia solution, the ester going into solution in the ether. The ether solution is then treated with a small amount of hydrochloric acid (about 5-10% of the amount which is necessary to neutralize the originally used amount of quinin) which removes unaltered quinin. There remains a spongy mass melting at about 70° C. which on analysis exhibits the constitution of diglycollic acid quinin ester. The substance is an absolutely tasteless, voluminous white powder, sparingly soluble in water, very readily soluble in ether, benzene, chloroform, less soluble in ligroin.

Example 2: 10 parts by weight of quinin are dissolved in 55 parts by volume of dichlorethylene, the solution is cooled to 0° C. and 1.4 parts by weight of diglycollic chlorid dissolved in 15 parts by volume of dichlorethylene are gradually poured in, the whole being well stirred. The temperature of the mixture is kept during the process between 10° and 15° C. The liquid is then repeatedly shaken with 200 parts of water, which takes up the unaltered quinin in the form of its hydrochloric acid salt. The dichlorethylene solution is then stirred together with 200 parts of 1% sulfuric acid, the ester entering the aqueous solution as sulfate. To this aqueous solution 6 parts of sodium acetate in 40 parts of water are added, whereupon the sulfate of diglycollic quinin ester separates in the crystalline state. Dried in the air it possesses the formula

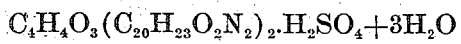

and is absolutely tasteless. It is very sparingly soluble in water and organic solvents.

Example 3: 6.5 parts by weight of quinin are heated with 3 parts by weight of diglycollicphenylester, described in U. S. Patent No. 948084 in a vacuum for 4 hours to a temperature of 120° C. whereby phenol distils off. The residue is dissolved in chloroform and freed from unaltered quinin by shaking with small quantities of dilute acetic acid. The chloroform solution is then dried and evaporated. Diglycollic acid quinin ester remains.

Example 4: 0.6 parts of magnesium are treated according to Grignard's method with 3 parts of ethyl bromid in ethereal solution. To this solution 8 parts of quinin dissolved in chloroform are added, the whole being well stirred and cooled. After all has been added, the mixture is slightly heated. It is then again cooled and 3 parts of diglycollic chlorid added and the whole heated slightly and finally boiled for an hour. The excess of quinin is extracted from the organic solvent by agitating it with small quantities of 1% sulfuric acid solution; the ether chloroform solution is dried and evaporated to dryness in a vacuum. Diglycollic acid quinin ester remains as residue.

What I claim and desire to secure by Letters Patent, is:

1. The preparation of tasteless quinin compounds which consists in subjecting quinin, together with a compound containing the diglycollic acid radical to a process of esterification.

2. In the preparation of tasteless quinin compounds, the process which consists in reacting on quinin with a compound containing the diglycollic acid radical.

3. The preparation of tasteless quinin compounds of quinin and diglycollic acid by reacting with diglycollic chlorid on quinin.

4. The preparation of tasteless quinin compounds of quinin and diglycollic acid by dissolving quinin in a suitable organic solvent and adding diglycollic chlorid.

5. The preparation of tasteless quinin compounds of quinin and diglycollic acid by dissolving quinin in a suitable organic solvent, adding diglycollic chlorid, cooling and agitating the mixture.

6. The preparation of tasteless quinin compounds of quinin and diglycollic acid by dissolving quinin in a suitable organic solvent, adding diglycollic chlorid, cooling and agitating the mixture, and at the conclusion of the reaction, isolating the new ester as base according to known methods.

7. The preparation of tasteless quinin compounds of quinin and diglycollic acid by dissolving quinin in a suitable organic solvent, adding diglycollic chlorid, cooling and agitating the mixture, and at the conclusion of the reaction, isolating the new ester in the form of a salt according to known methods.

8. In the art of preparing tasteless quinin compounds, the process which consists in reacting on quinin with a compound containing the diglycollic acid radical, and then acting on the resultant ester with an acid.

9. As a new composition of matter, a compound in which diglycollic acid is combined with quinin and which has the general formula $$C_4H_4O_3(C_{20}H_{23}O_2N_2)_2.xAc,$$

wherein $Ac$ represents any acid and $x$ is any number, zero included.

10. As a new composition of matter the sulfate of diglycollic acid quinin ester, possessing the formula $$C_4H_4O_3(C_{20}H_{23}O_2N_2)_2.H_2SO_4.3H_2O,$$

which is a tasteless, colorless crystalline powder, very sparely soluble in water and organic solvents.

In testimony whereof I hereunto affix my signature in the presence of two witnesses.

LORENZ ACH.

Witnesses:
ERNEST L. IVES,
W. W. SCHMIDT.